(12) United States Patent
Sharp

(10) Patent No.: US 10,882,570 B1
(45) Date of Patent: Jan. 5, 2021

(54) TAILGATE LATCH SYSTEM

(71) Applicant: MAR-K SPECIALIZED MANUFACTURING, INC., Oklahoma City, OK (US)

(72) Inventor: Mark Edward Sharp, Oklahoma City, OK (US)

(73) Assignee: MAR-K SPECIALIZED MANUFACTURING, INC., Oklahoma City, OK (US)

( * ) Notice: Subject to any disclaimer, the term of this patent is extended or adjusted under 35 U.S.C. 154(b) by 221 days.

(21) Appl. No.: 16/267,892

(22) Filed: Feb. 5, 2019

(51) Int. Cl.
*B62D 33/037* (2006.01)
*B62D 33/03* (2006.01)

(52) U.S. Cl.
CPC .......... *B62D 33/037* (2013.01); *B62D 33/03* (2013.01)

(58) Field of Classification Search
CPC ....... B62D 33/037; B62D 33/03; E05B 83/16; Y10S 292/29
See application file for complete search history.

(56) References Cited

U.S. PATENT DOCUMENTS

| | | | |
|---|---|---|---|
| 4,703,961 A | 11/1987 | Weinerman et al. | |
| 5,265,450 A * | 11/1993 | Doyle | E05B 17/2034 292/35 |
| 5,439,260 A | 8/1995 | Weinerman et al. | |
| 6,030,019 A * | 2/2000 | Stiltner | B62D 33/037 292/39 |
| 6,276,738 B1 * | 8/2001 | Marshall | B60P 1/26 296/37.6 |
| 6,431,630 B1 * | 8/2002 | Meinke | B62D 33/0273 296/50 |
| 6,874,837 B2 * | 4/2005 | Bruford | B62D 33/0273 16/308 |
| 7,303,218 B2 * | 12/2007 | Kraenzle | B62D 33/037 292/304 |
| 8,141,929 B2 * | 3/2012 | Marshall | B62D 33/0273 296/51 |
| 8,532,873 B1 * | 9/2013 | Bambenek | E05B 81/76 701/36 |
| 8,903,605 B2 | 12/2014 | Bambenek et al. | |
| 2014/0136021 A1 * | 5/2014 | Bambenek | G07C 5/008 701/2 |
| 2018/0038139 A1 * | 2/2018 | Zindler | B62D 25/12 |
| 2020/0247484 A1 * | 8/2020 | Fleming | B62D 33/03 |

OTHER PUBLICATIONS

Printout, www.eberhard.com/products/rotaries-strikers/240-241-series/19578, last accessed Feb. 1, 2019, 1 p.

* cited by examiner

*Primary Examiner* — Justin B Rephann
(74) *Attorney, Agent, or Firm* — Shane Cortesi

(57) ABSTRACT

A tailgate latch system is described. The tailgate latch system may comprise an actuatable button located on a pickup truck tailgate, at least one rotatable rod located in the tailgate interior that is configured to rotate clockwise or counterclockwise upon actuating the button and a rotary latch that is configured to disengage a bedside striker pin upon rotation of the at least one rotatable rod.

16 Claims, 17 Drawing Sheets

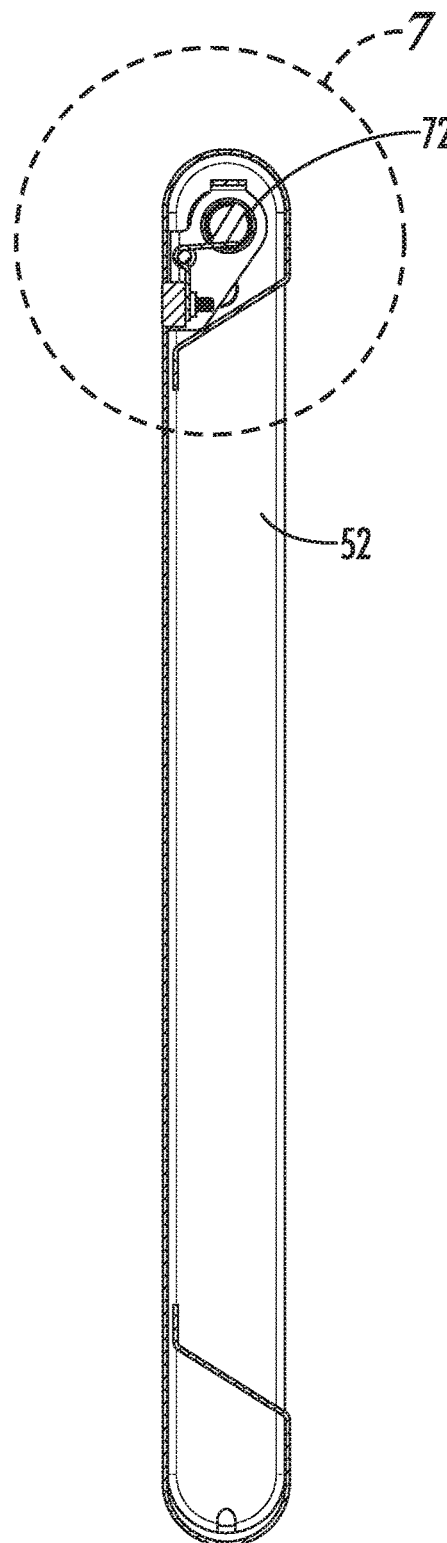
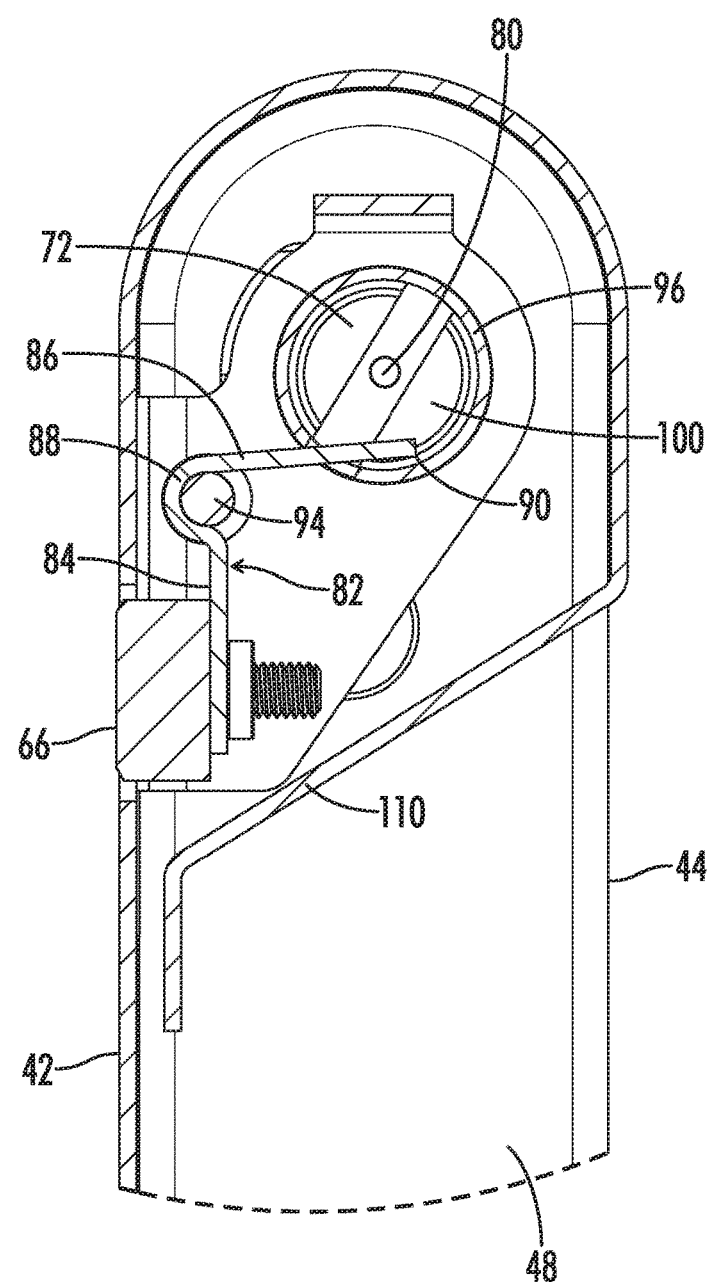
FIG. 6
FIG. 7

US 10,882,570 B1

TAILGATE LATCH SYSTEM

BACKGROUND

Technical Field

The present invention relates to latch systems for pickup trucks.

Background of the Invention

Present day pickup trucks generally include a latch for closing the tailgate. Examples of known latching systems include U.S. Pat. No. 8,903,605. However, older pickup trucks, which are still coveted by collectors, did not typically include a latch for the tailgate. Instead, typically the tailgates on older pickup trucks were originally latched closed with a chain and hook that served also to hold the tailgate level when it was opened. Thus, due to the chain and hook, old truck tailgates are not aesthetically pleasing and more difficult to open and close than modern trucks.

Thus, there is a need for easy-to-use, reliable apparatuses for opening and closing classic truck tailgates without detracting from their charm.

BRIEF SUMMARY

The present disclosure provides a tailgate latch as described herein.

BRIEF DESCRIPTION OF THE DRAWINGS

in FIG. 1, the tailgate is in an upright position and the right rotary latch claw is engaging the right bedside striker pin.

in FIG. 2, the tailgate is in a partially lowered position and the right rotary latch claw is not engaging the right bedside striker pin.

in FIG. 3, the tailgate skin is removed to better show the internal components.

in FIG. 4, the tailgate skin is removed to better show the internal components.

in FIG. 5, the tailgate is in an upright position and the right rotary latch claw is engaging the right bedside striker pin.

FIG. 6 illustrates a sectional view of the tailgate of FIG. 5, taken along line 6-6 of FIG. 5.

FIG. 7 illustrates a sectional view of the circled area labelled with the numeral 7 in FIG. 6; in FIG. 7, the push button has not been depressed.

in FIG. 8, the push button has been depressed causing the horizontal bar portion to rotate the at least one rotatable rod clockwise, as compared to FIG. 7.

in FIG. 9, the push button has not been depressed.

in FIG. 10, the push button has been depressed, which has caused the horizontal bar portion to rotate the at least one rotatable rod clockwise as compared to FIG. 9.

in FIG. 11, the push button has not been depressed.

in FIG. 12, the push button has been depressed, which has caused the horizontal bar portion to rotate the at least one rotatable rod clockwise as compared to FIG. 11.

in FIG. 13, the push button has not been depressed.

in FIG. 14, the push button has been depressed, which has caused the horizontal bar portion to rotate the at least one rotatable rod clockwise as compared to FIG. 13.

in FIG. 15, the right rotary latch claw is in a position configured to engage the right bedside striker pin.

in FIG. 16, the right rotary latch claw is in a position configured to engage the right bedside striker pin.

in FIG. 17, the right rotary latch claw is in a position configured to disengage the right bedside striker pin.

in FIG. 18, the right rotary latch claw is in a position configured to disengage the right bedside striker pin.

in FIG. 19, the right rotary latch claw is in a position configured to engage the right bedside striker pin.

in FIG. 20, the right rotary latch claw is in a position configured to engage the right bedside striker pin.

in FIG. 21, the right rotary latch claw is in a position configured to disengage the right bedside striker pin.

in FIG. 22, the right rotary latch claw is in a position configured to disengage the right bedside striker pin.

DETAILED DESCRIPTION

Figure 1:
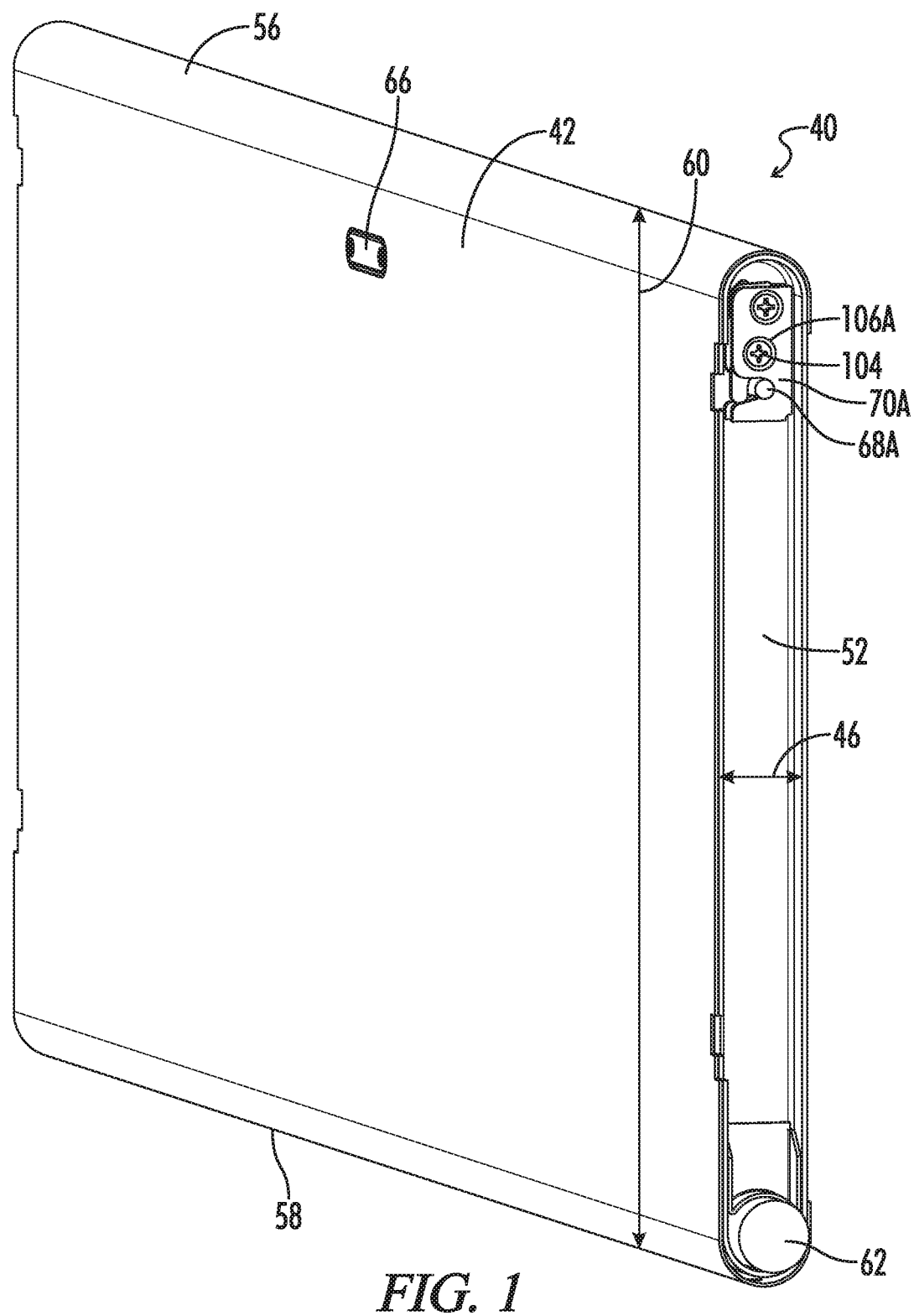
FIG. 1 illustrates a front perspective view of a tailgate and right bedside striker pin of one embodiment of the present invention.
Figure 1A:
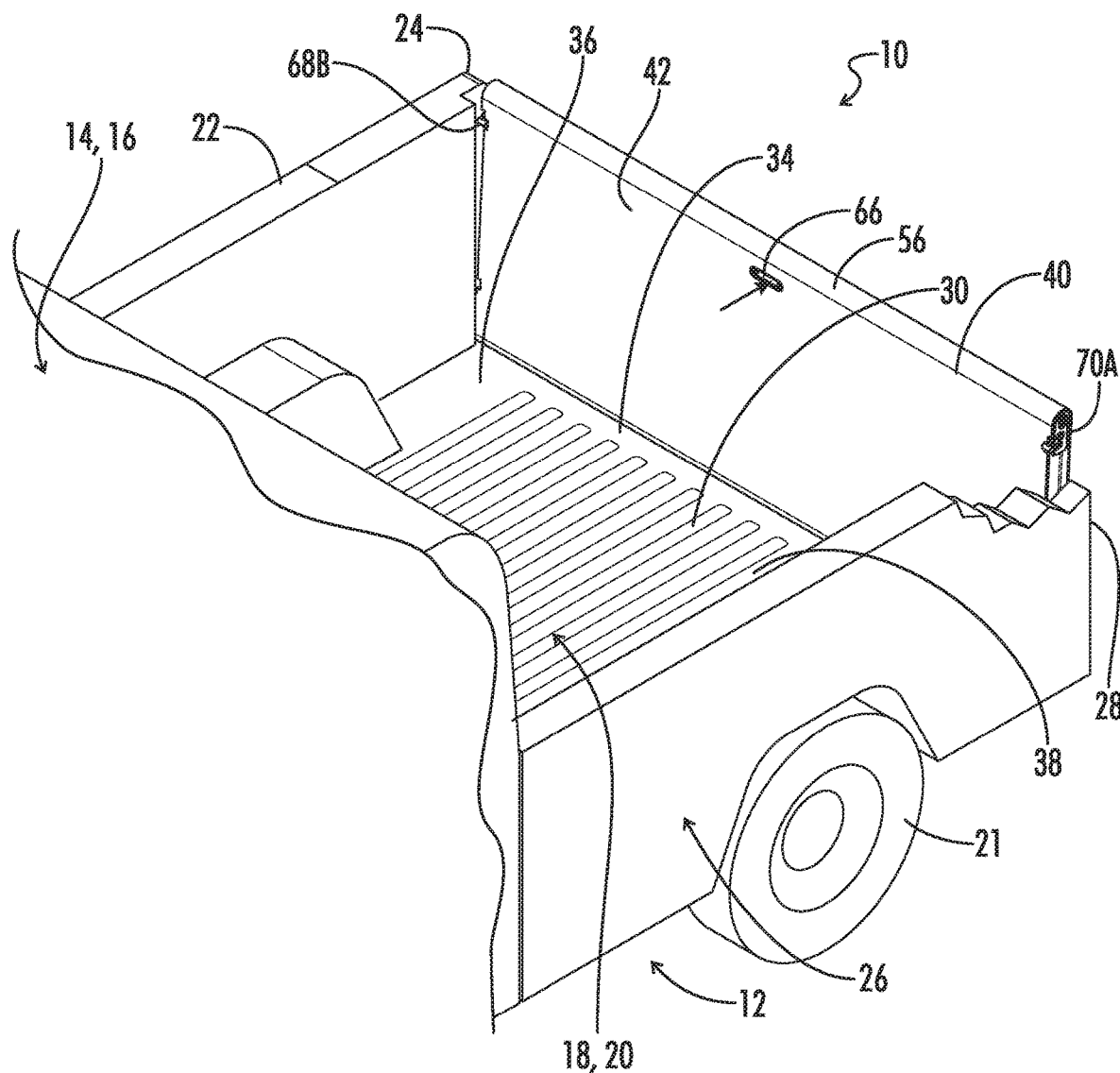
FIG. 1A illustrates a side perspective view of the cargo area of a pickup truck using the tailgate of FIG. 1.
Figure 2:
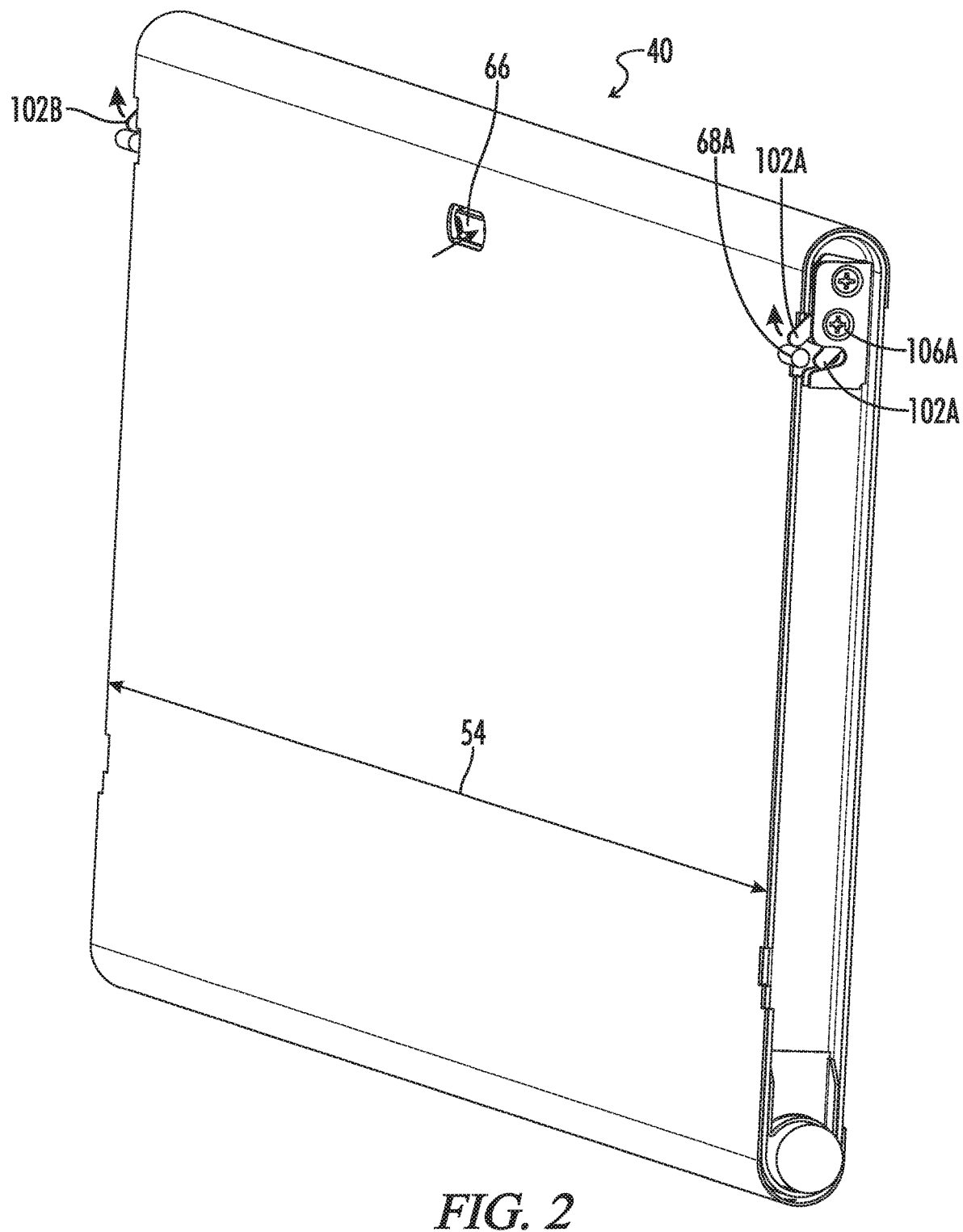
FIG. 2 illustrates a front perspective view of the tailgate and right bedside striker pin of FIG. 1.
Figure 3:
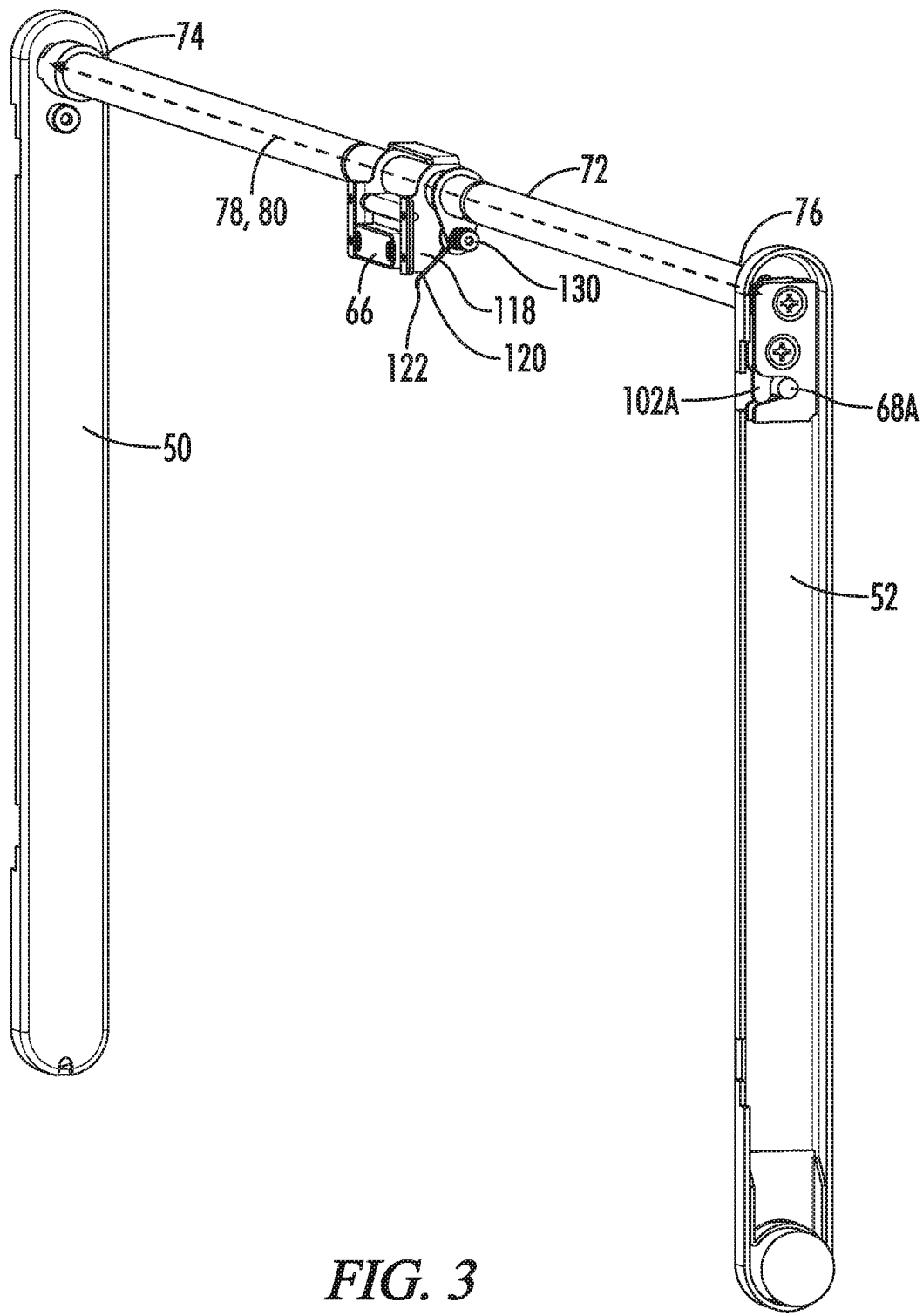
FIG. 3 illustrates a front perspective view of the tailgate and right bedside striker pin of FIG. 1 with the tailgate in the upright position and the right rotary latch claw engaging the right bedside striker pin.
Figure 4:
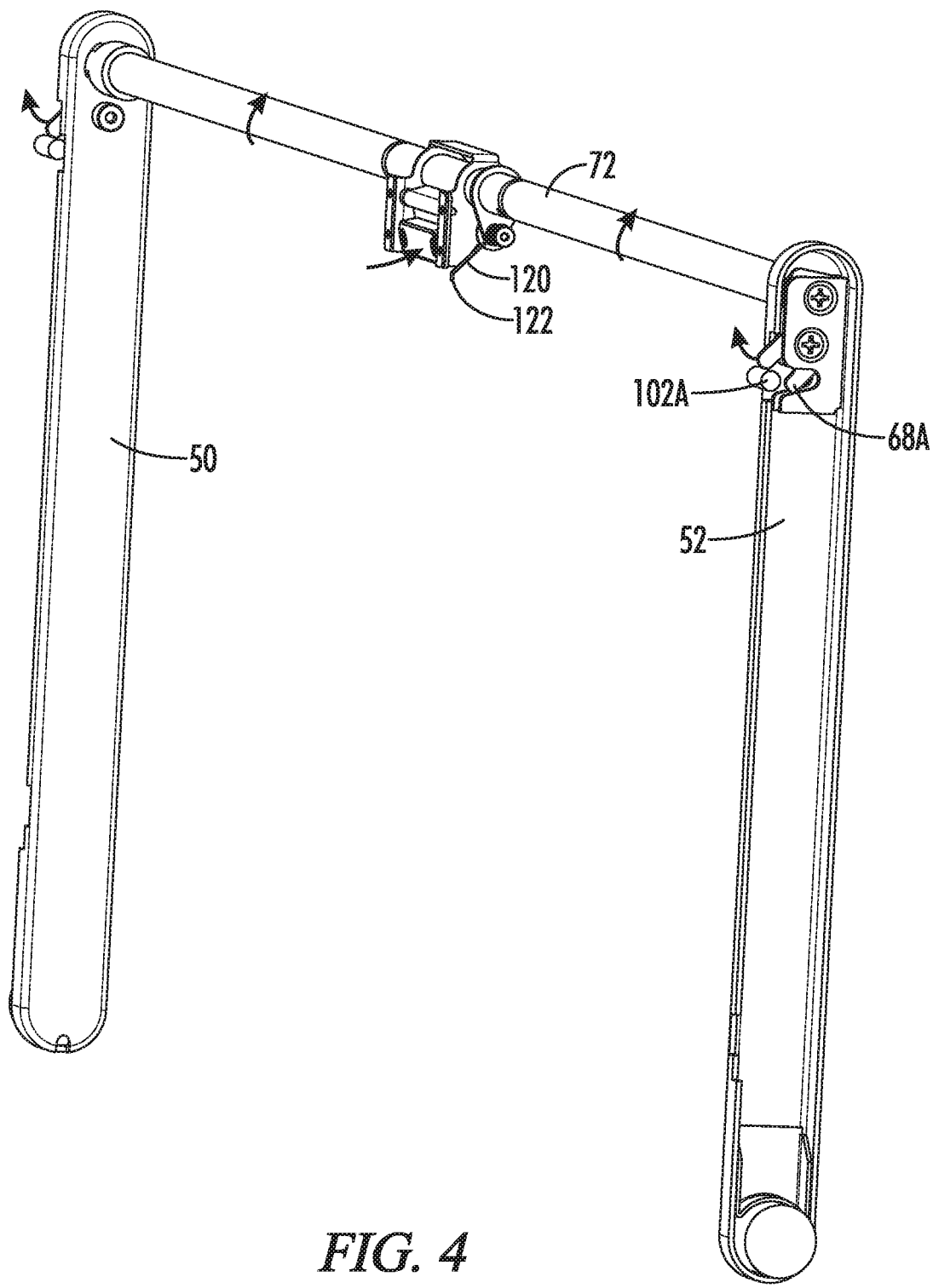
FIG. 4 illustrates a front perspective view of the tailgate and right bedside striker pin of FIG. 1 with the tailgate in a partially lowered position and the right rotary latch claw not engaging the right bedside striker pin.
Figure 5:
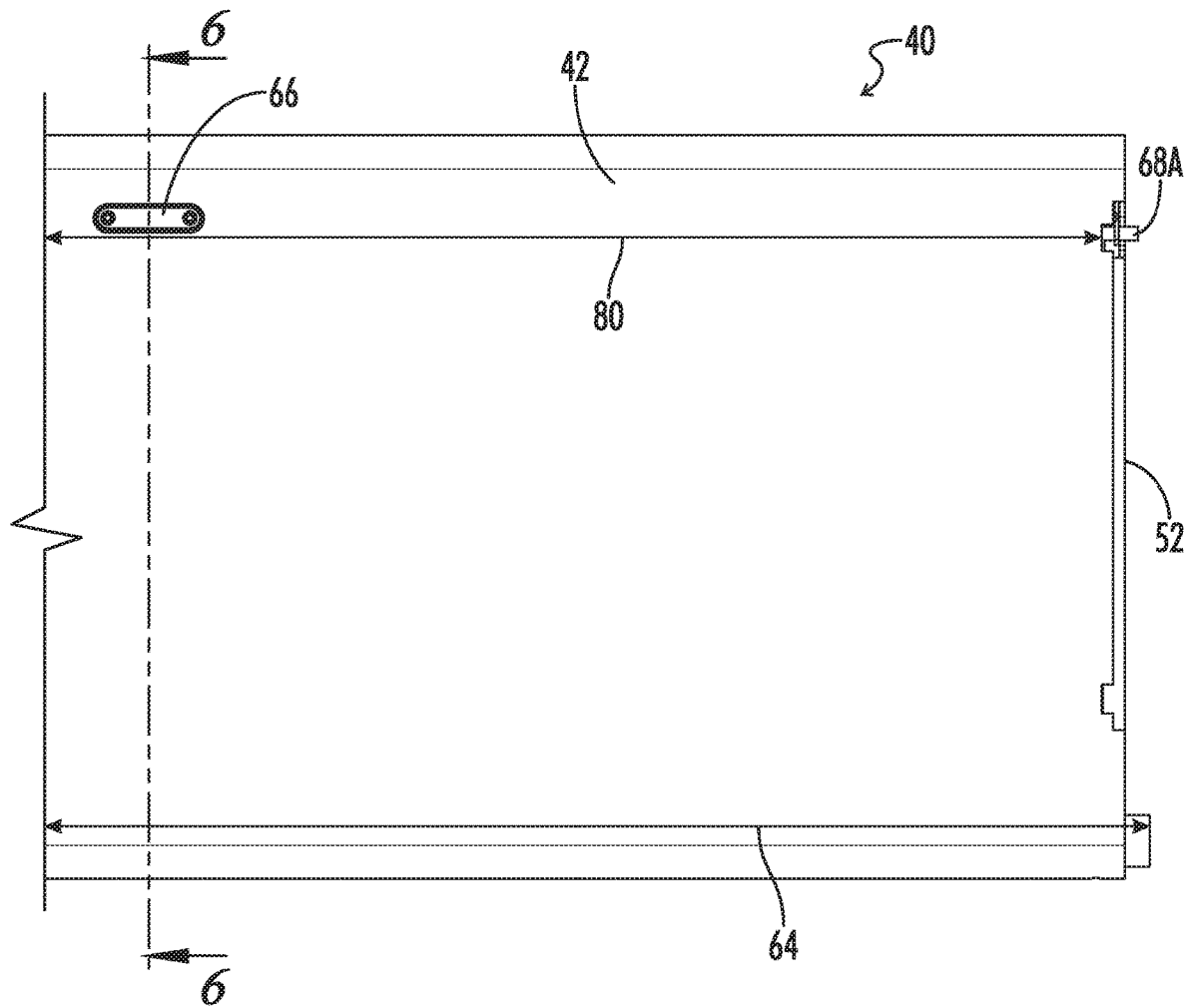
FIG. 5 illustrates a front elevation view of a portion of the tailgate of FIG. 1 and the right bedside striker pin.
Figure 8:
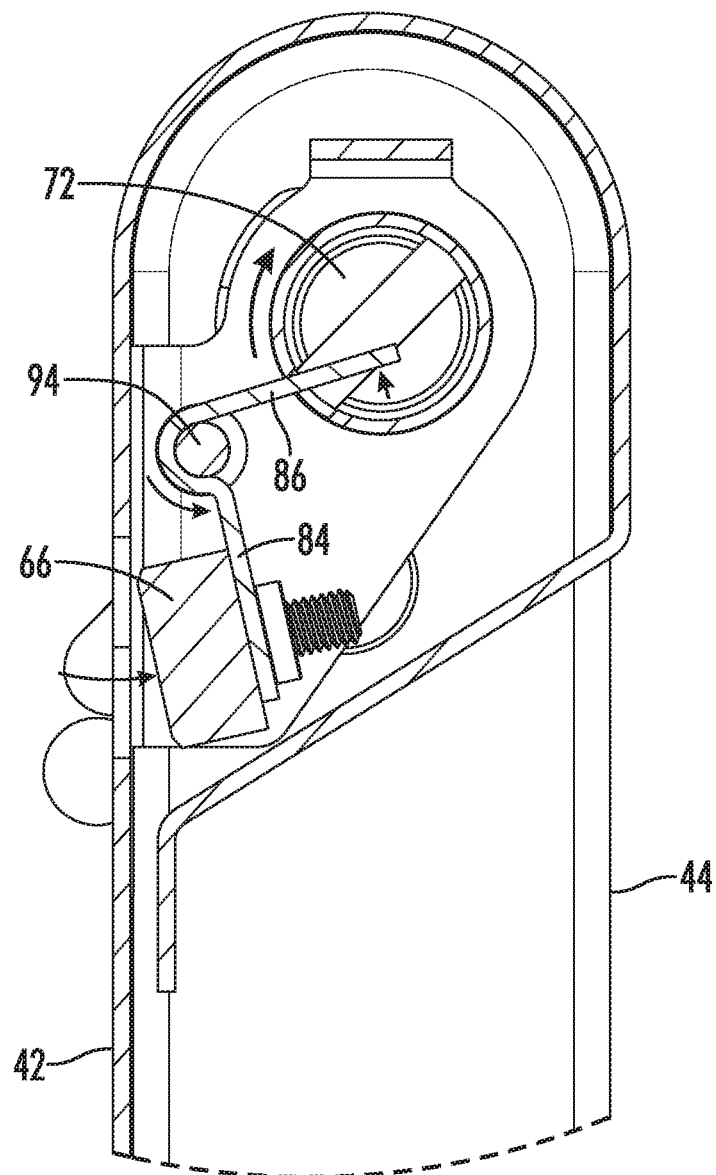
FIG. 8 illustrates a sectional view of the circled area labelled with the numeral 7 in FIG. 6.
Figure 9:
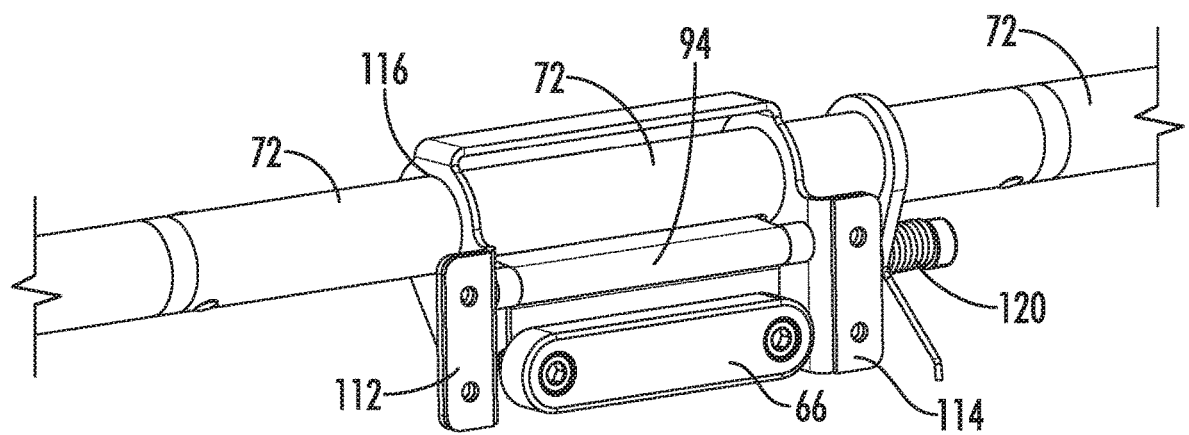
FIG. 9 illustrates a front perspective view of the handle bracket, at least one rotatable rod, spring and push button of the tailgate of FIG. 1.
Figure 10:
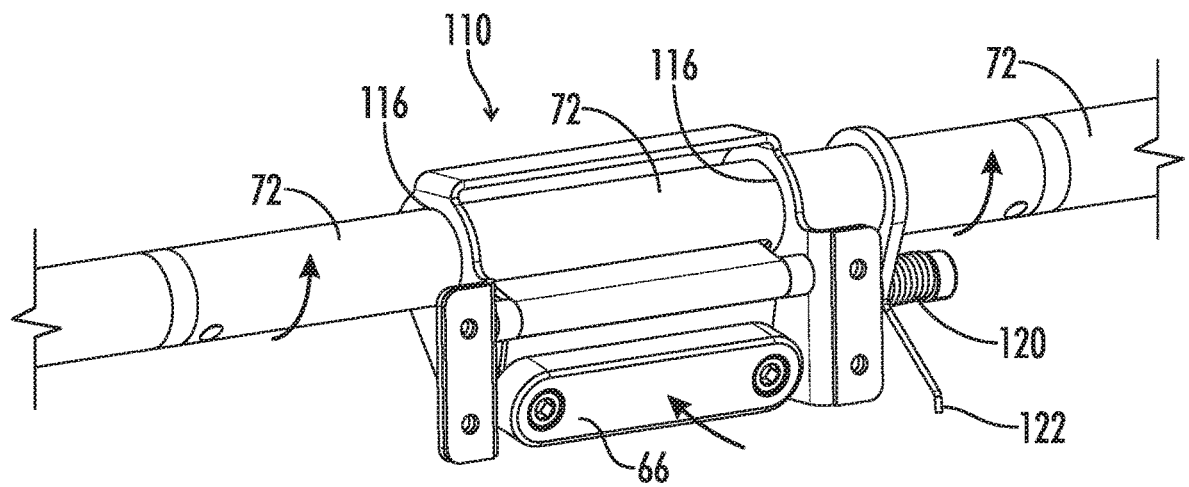
FIG. 10 illustrates a front perspective view of the handle bracket, at least one rotatable rod, spring and push button of the tailgate of FIG. 1.

With reference to FIGS. 1-22, the present invention provides a tailgate latch system designated by the numeral 10. In the drawings, not all reference numbers are included in each drawing for the sake of clarity. The drawings in FIGS. 1-22 are engineering drawings, drawn to scale. However, it will be understood that other proportions of the components are possible. It will be further appreciated that directional arrows are provided in some figures to show movement of the parts. It will also be appreciated that some components located on the right/driver-side of the truck are labelled with an "A" at the end of the reference numeral and that similar components located on the left/passenger-side of the truck are labelled with a "B" at the end of the reference numeral.

Referring further to FIGS. 1-22, the tailgate latch system 10 may include a pickup truck 12 that may include a plurality of wheels 21, a forward section 14 comprising a truck cab 16, a rear section 18 comprising a cargo area 20 that may include a left bedside 22 having a left bedside rear 24, a right bedside 26 having a right bedside rear 28, and a cargo area bottom comprising a truck bed 30. The truck bed 30 may include a bed front 32, a bed rear 34, a bed left side 36 and a bed right side 38. In the illustrations, the right side is referred to as the driver side and the left side is referred to as the passenger side.

The tailgate gate latch system 10 may further include a tailgate 40 located at the bed rear 34. As with conventional tailgates, the tailgate 40 may include a front surface 42, a rear surface 44, a tailgate thickness 46 extending from the front surface 42 to the rear surface 44, a tailgate interior 48, a tailgate left side 50, a tailgate right side 52, a tailgate width 54 extending from the tailgate left side 50 to the tailgate right side 52 and generally perpendicular to the tailgate thickness 46, a tailgate top 56, a tailgate bottom 58, a tailgate height 60 extending from the tailgate top 56 to the tailgate bottom 58 and generally perpendicular to the tailgate width 54 and tailgate thickness 46. As with conventional tailgates, the tailgate 40 may be hingedly attached to the left bedside 22 and the right bedside 26 by a hinge 62 located adjacent to the tailgate bottom 58, and the tailgate 40 may be configured to pivot along a tailgate pivot axis 64 from an upright position in which the tailgate front surface 42 is generally perpendicular to the truck bed 30 and faces the cargo area 20 to a lowered position in which the tailgate 40 is generally parallel to the truck bed 30.

Unlike conventional tailgates, the tailgate 40 may further include a tailgate gate latch system that may include a button 66 located on the tailgate rear surface 44 or tailgate front surface 42, at least one striker pin/strike bolt 68 located on at least one of the left bedside 22 adjacent to the left bedside rear 24 and the right bedside 26 adjacent to the right bedside rear 28, at least one rotary latch/bear claw 70 configured to releasably engage the at least one striker pin 68 and prevent the tailgate 40 from moving relative to the at least one striker pin 68, and at least one rotatable rod 72, which may be located in the tailgate interior 48 and may be connected to the rotary latch 70 and having a proximal end 74, a distal end 76, and a rotatable rod length 78 generally parallel to the tailgate width 54. Optionally, the tailgate pivot axis 64 is generally parallel to the tailgate width 54. Optionally, the at least one rotary latch 70 is configured to releasably engage/capture the at least one striker pin 68 and maintain the tailgate 40 in the upright position. Optionally, when the tailgate 40 is in the upright position, actuating the button 66 is configured to cause the rotatable rod 72 to rotate counterclockwise or clockwise from a start position about a rod pivot axis 80 generally parallel to the tailgate pivot axis 64 and cause the at least one latch 70 to disengage from the striker pin 68, thereby causing the tailgate 40 to move from the upright position to the lowered position.

Optionally, the button 66 is a depressable push button 66, and, as best seen in FIGS. 6-8 and 13-14, the tailgate latch system further comprises a generally L-shaped button-mounting bracket 82 located in the tailgate interior 48 and having a vertical bar portion 84 attached to the push button 66 (e.g., via a bolt as shown in the illustrations), a horizontal bar portion 86 comprising a proximal end 88 and a free distal end 90, and a generally C-shaped recess 92 located between the horizontal bar portion 86 and vertical bar portion 84, a bracket pin 94 located in the generally C-shaped recess 92. Optionally, the generally L-shaped button-mounting bracket 82 is configured to pivot at the bracket pin 94. Optionally, the at least one rotatable rod 72 adjacent to the horizontal bar portion 86 comprises an interior 100 and a wall 96 surrounding the interior 100 and comprising a slot 98. Optionally, the distal end 90 of the horizontal bar portion 86 extends through the slot 98 into the rotatable rod interior 100, and depressing the push button 66 is configured to move the distal end 90 of the horizontal bar portion 86 upwards at an angle and thereby cause the at least one rotatable rod 72 to rotate clockwise or counterclockwise, as shown by comparing FIG. 13 with FIG. 14 and comparing FIG. 7 with FIG. 8. Optionally, when the tailgate 40 is in the upright position, the vertical bar portion 84 is generally parallel to the tailgate height 60 and the horizontal bar portion 86 is generally perpendicular to the tailgate height 60. Optionally, if the button 66 is located on the tailgate front surface 42, as shown in the illustrations, the distal end 90 is the rear end of the horizontal portion 86, as shown in FIGS. 7-8 and 13-14. (It will be appreciated that positioning the button 66 on the tailgate front surface 42 allows the tailgate rear surface 44, which is visible from the exterior, to look like a classic truck). Optionally, the bracket pin 94 is attached to and, configured to move/rotate, with the generally L-shaped button mounting bracket 82, as shown in FIGS. 7-8 and 13-14.

In the exemplary embodiments shown in the illustration, the rotary latches 70 are Product No. 240-R-54, commercially available from Eberhard (Strongsville, Ohio); https://www.eberhard.com/products/rotaries-strikers/240-241-series/19578 (last accessed Feb. 1, 2019). Rotary latches 70 are also described in, for example, U.S. Pat. Nos. 5,439,260 and 4,703,961, the entire contents of which are incorporated herein by reference. However, it will be understood that any suitable rotary latch may be used. For example, as best seen in FIGS. 19-22, the at least one rotary latch 70 may include at least one rotary jaw 102 comprising two arms separated by a rotary jaw recess 126. Optionally, at least one of the rotatable rod proximal end 74 and rotatable rod distal end 76 comprises an extension 108, and rotation of the rotatable rod 72 is configured to cause the extension 108 to cause the at least one rotary jaw 102 to rotate about a rotary jaw bolt 106 along a rotary jaw pivot axis 104 generally parallel to the tailgate width 54 from a rotary jaw start position in which the two arms of the at least one rotary jaw 102 surrounds the at least one striker pin 68 and the least one striker pin 68 is located in the rotary jaw recess 126 and prevents the at least one striker pin 68 from moving, as shown in FIGS. 1, 3, 5, and 15-16, and 19-20 (striker pin not shown in FIGS. 15-16 and 19-20), to a disengaged position in which the two moveable arms do not surround the at least one striker pin 68 and allow the at least one striker pin 68 to move, as shown in FIGS. 2, 4, and 17-18, and 21-22 (striker pin not shown in FIGS. 17-18 and 21-22). In the illustrations, the tailgate 40 includes a rotary latch 70 located on the tailgate left side 50 configured to engage the left bedside striker pin 68 and the rotary latch 70 located on the tailgate right side 52 configured to engage the right bedside striker pin 68. Optionally, the rotary latch(es) 70 further include a rotary pawl 128 engaging the extension 108 and the rotary jaw 102, and rotation of the rotatable rod 72 is configured to cause the extension 108 to cause the rotary pawl 128 to rotate and thereby cause the rotary jaw 102 to rotate about the rotary jaw bolt 106 along the rotary jaw pivot axis 104, as best seen by comparing FIGS. 21-22 with FIGS. 19-20.

Optionally, as with conventional tailgates, the tailgate 40 comprises a tailgate skin attached to the tailgate left side 50 and tailgate right side 52 and forming the tailgate front surface 42 and tailgate rear surface 44.

Optionally, the button is a push button 66, the tailgate further comprises a handle bracket 110 surrounding the push button 66 and having a left side 112 comprising a round pin opening 114 receiving a portion of the bracket pin 94 and a round rotatable rod opening 116 receiving a portion of the at least rotatable rod 72, and a right side comprising a round opening receiving another portion of the bracket pin 94 and a round rotatable rod opening 116 receiving another portion of the at least one rotatable rod 72. Optionally, the push button 66 is located between the handle bracket left side 112 and the handle bracket right side 118, as best seen in FIGS. 3, 4, and 9-12. Optionally, the handle bracket 110 is attached to at least one of the tailgate front surface 42 and tailgate rear surface 44.

Figure 11:
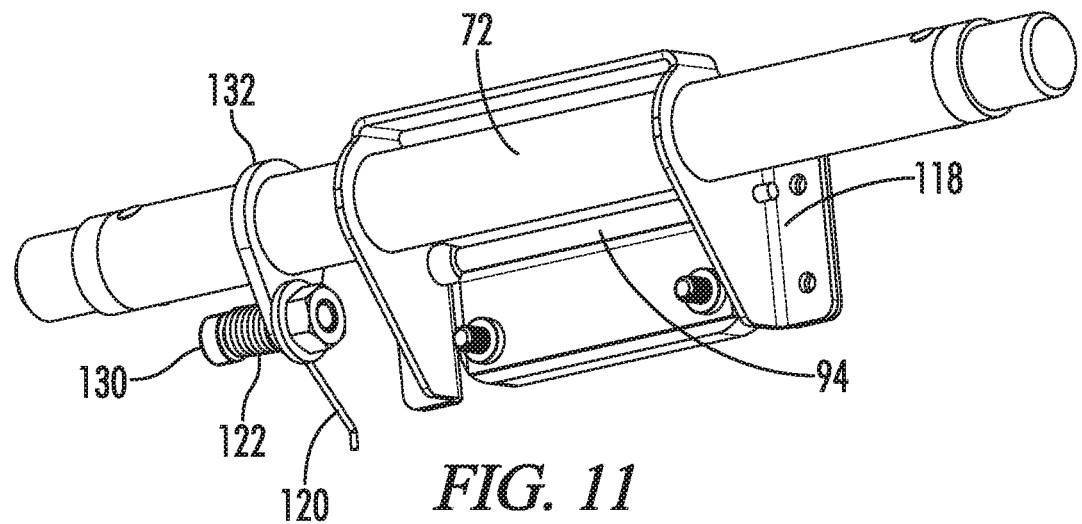
FIG. 11 illustrates a rear perspective view of the handle bracket, at least one rotatable rod, spring and push button of the tailgate of FIG. 1.
Figure 12:
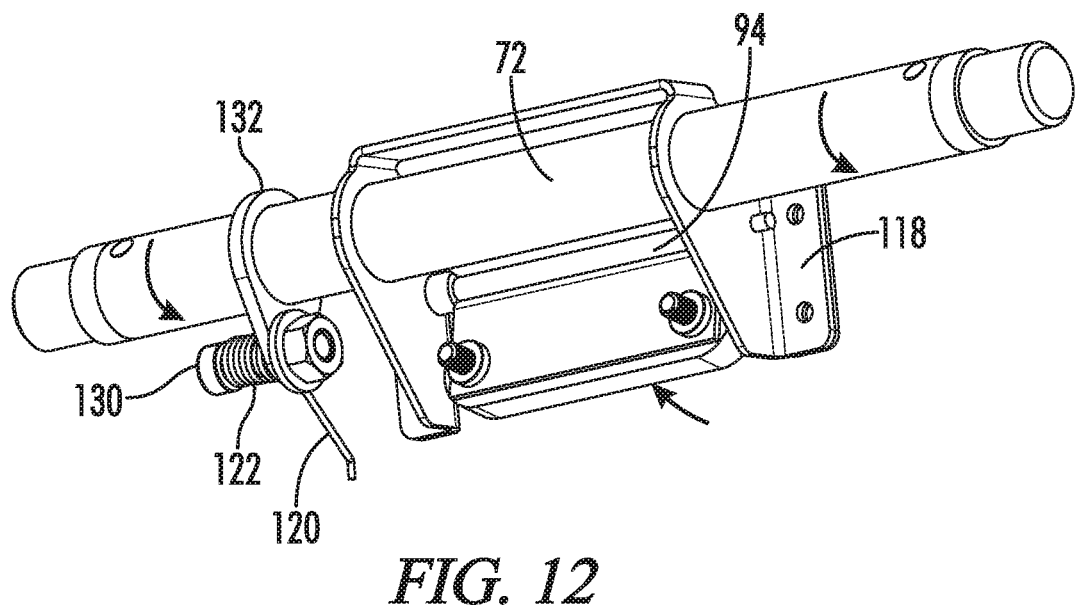
FIG. 12 illustrates a rear perspective view of the handle bracket, at least one rotatable rod, spring and push button of the tailgate of FIG. 1.
Figure 13:
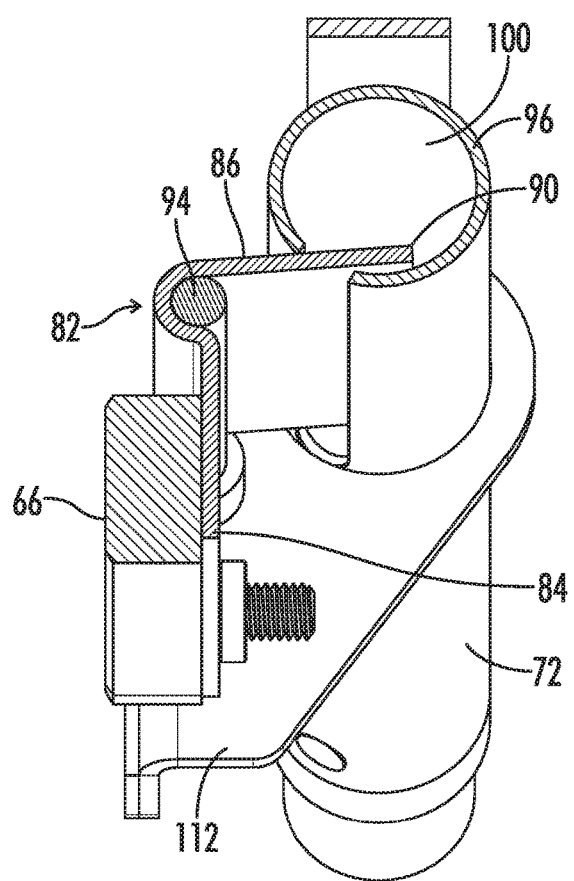
FIG. 13 illustrates a side perspective view of portions of the push button, L-shaped button mounting bracket, at least one rotatable rod and handle bracket of the tailgate of FIG. 1.
Figure 14:
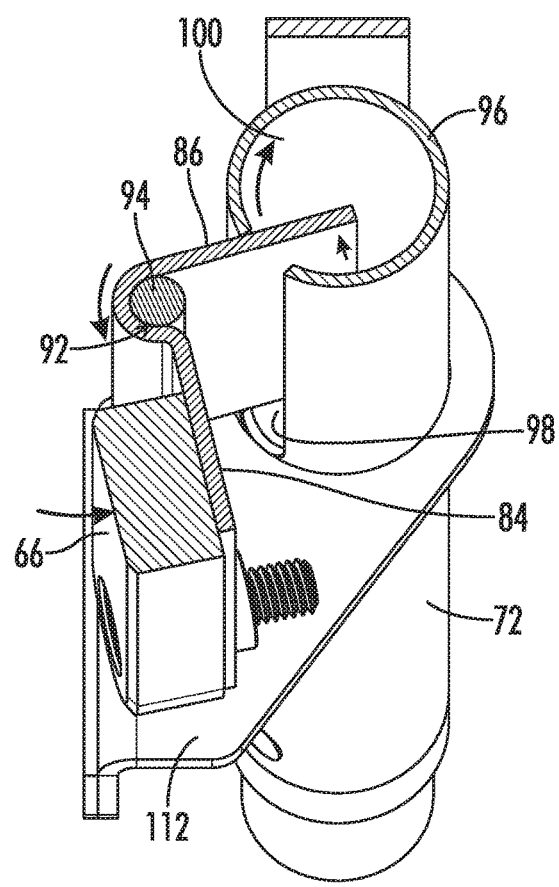
FIG. 14 illustrates a side perspective view of portions of the push button, L-shaped button mounting bracket, at least one rotatable rod and handle bracket of the tailgate of FIG. 1.
Figure 15:
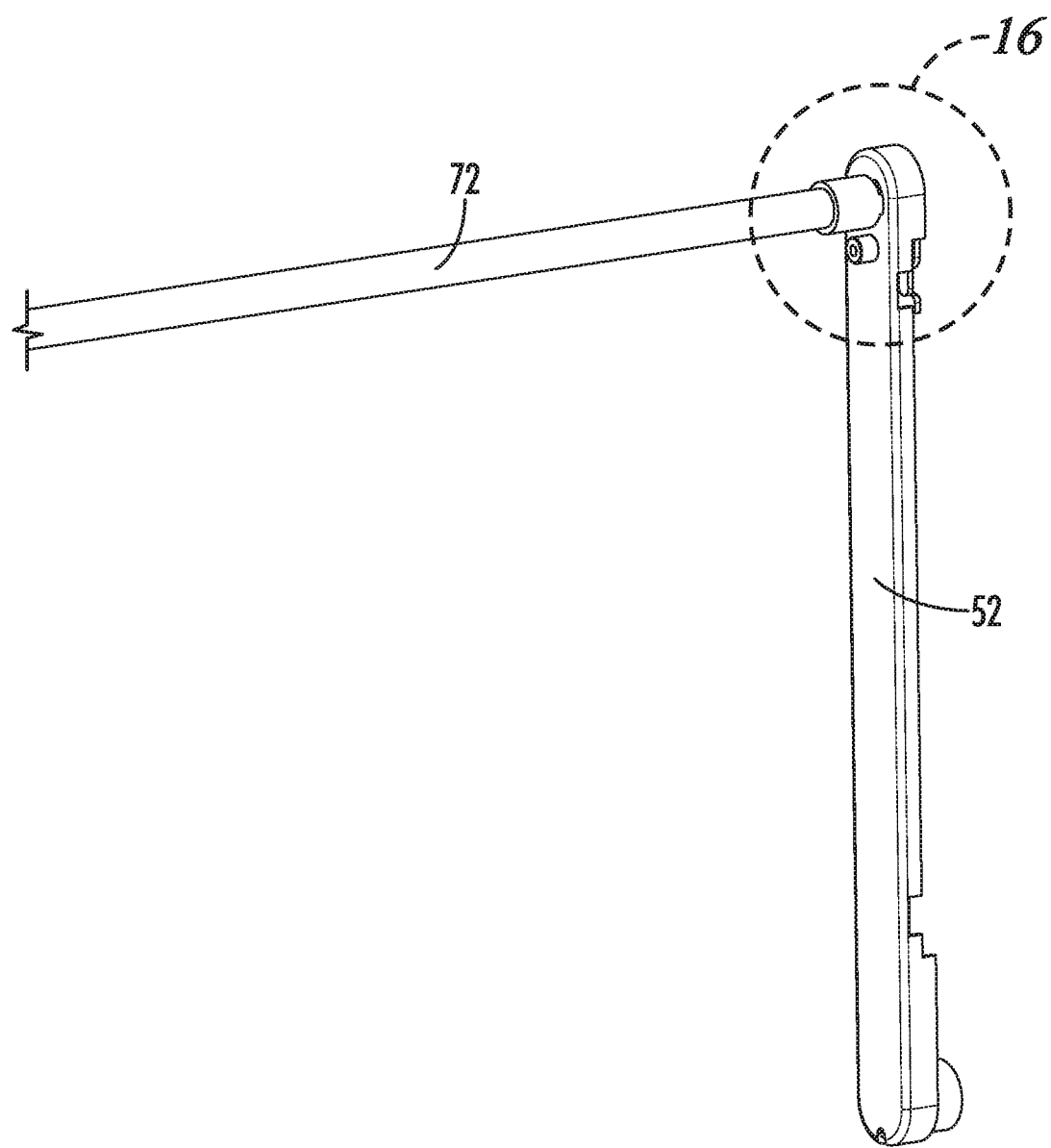
FIG. 15 illustrates a front perspective view of a portion of the at least one rotatable rod, tailgate right side and right side rotary latch of the tailgate of FIG. 1.
Figure 16:
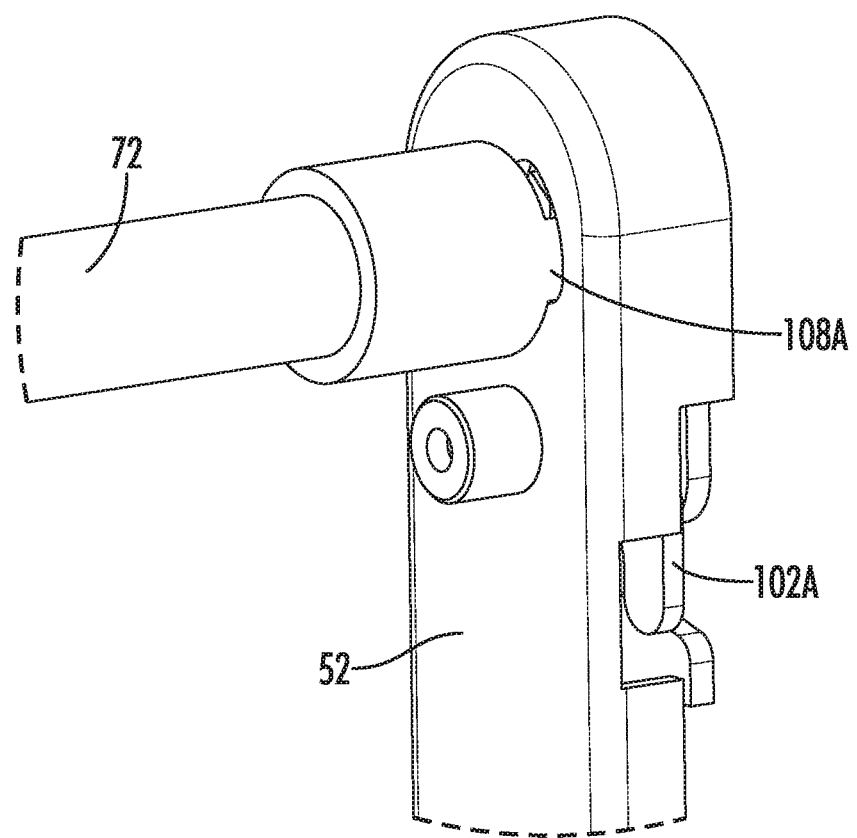
FIG. 16 illustrates a front perspective view of the circled area labelled with the numeral 16 in FIG. 15.
Figure 17:
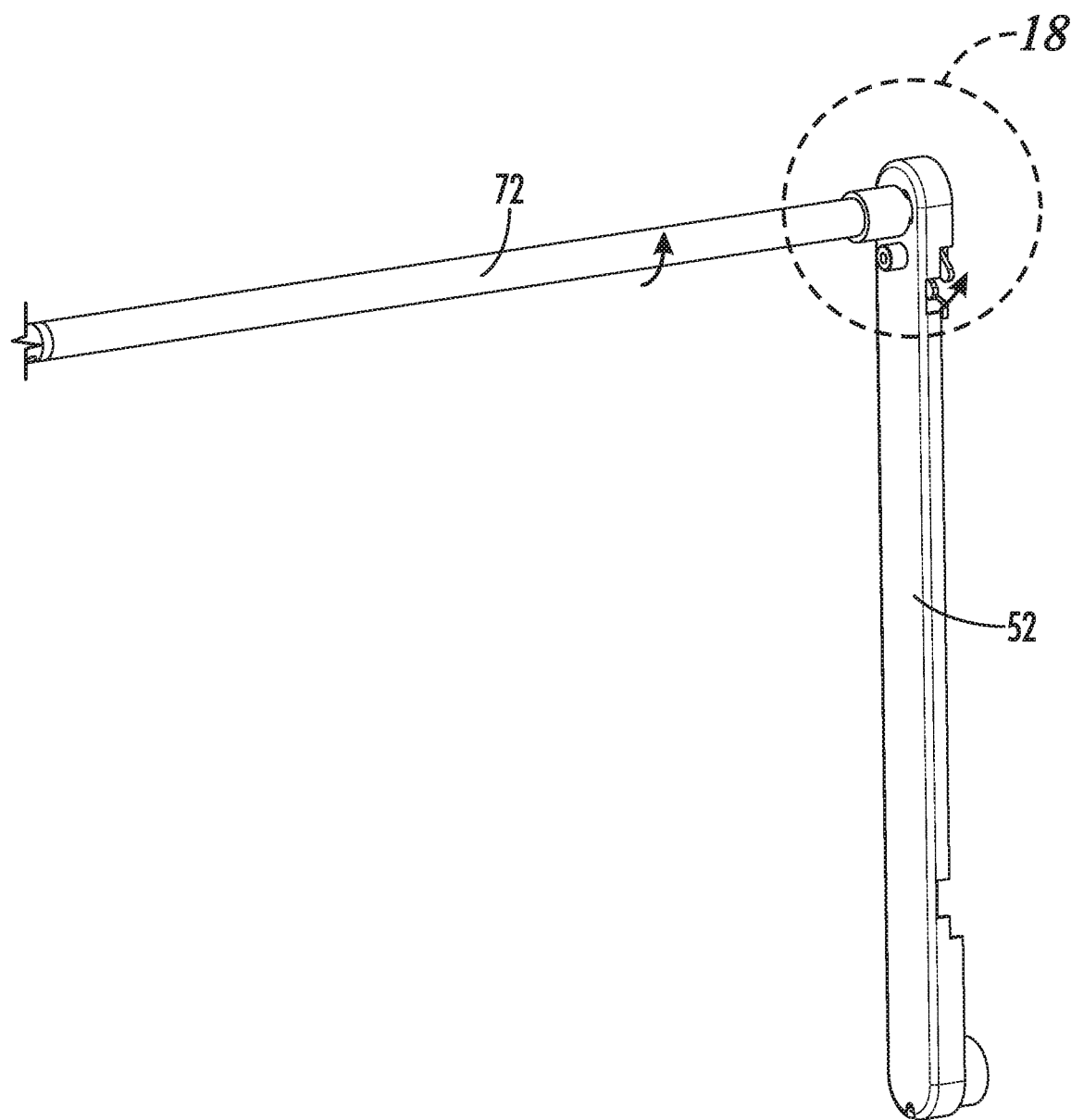
FIG. 17 illustrates a front perspective view of a portion of the at least one rotatable rod, tailgate right side and right side rotary latch of the tailgate of FIG. 1.
Figure 18:
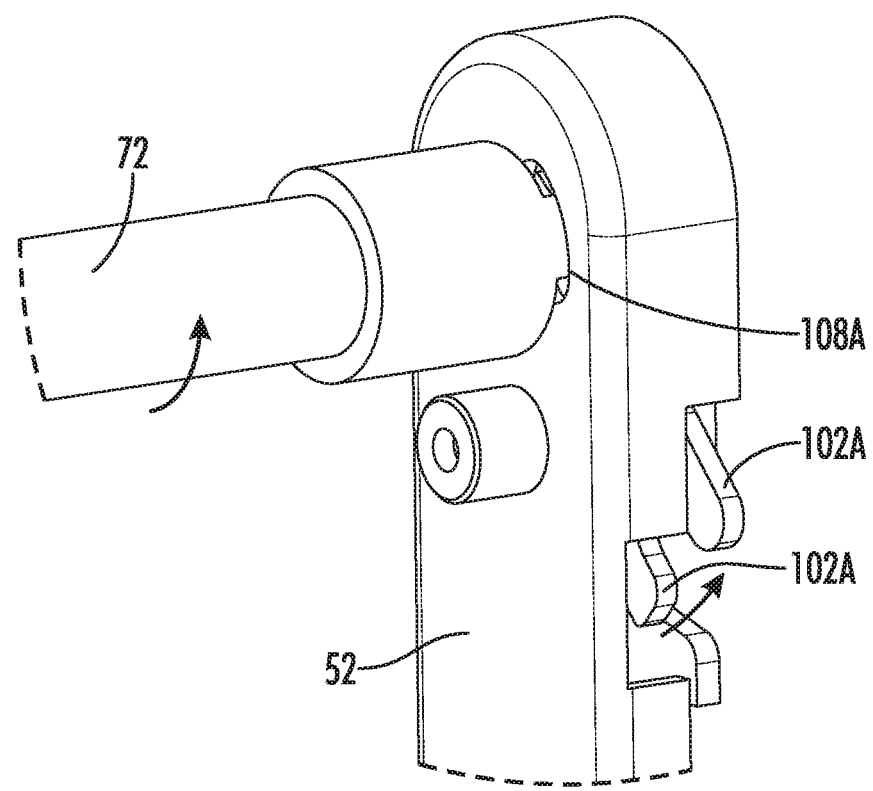
FIG. 18 illustrates a front perspective view of the circled area labelled with the numeral 18 in FIG. 17.
Figure 19:
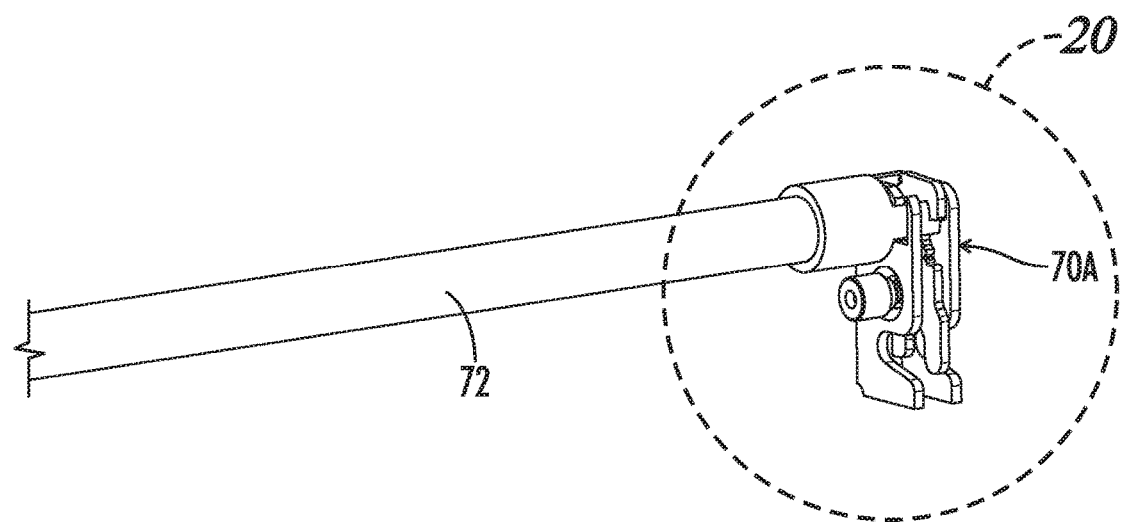
FIG. 19 illustrates a front perspective view of a portion of the at least one rotatable rod and right side rotary latch of the tailgate of FIG. 1.
Figure 20:
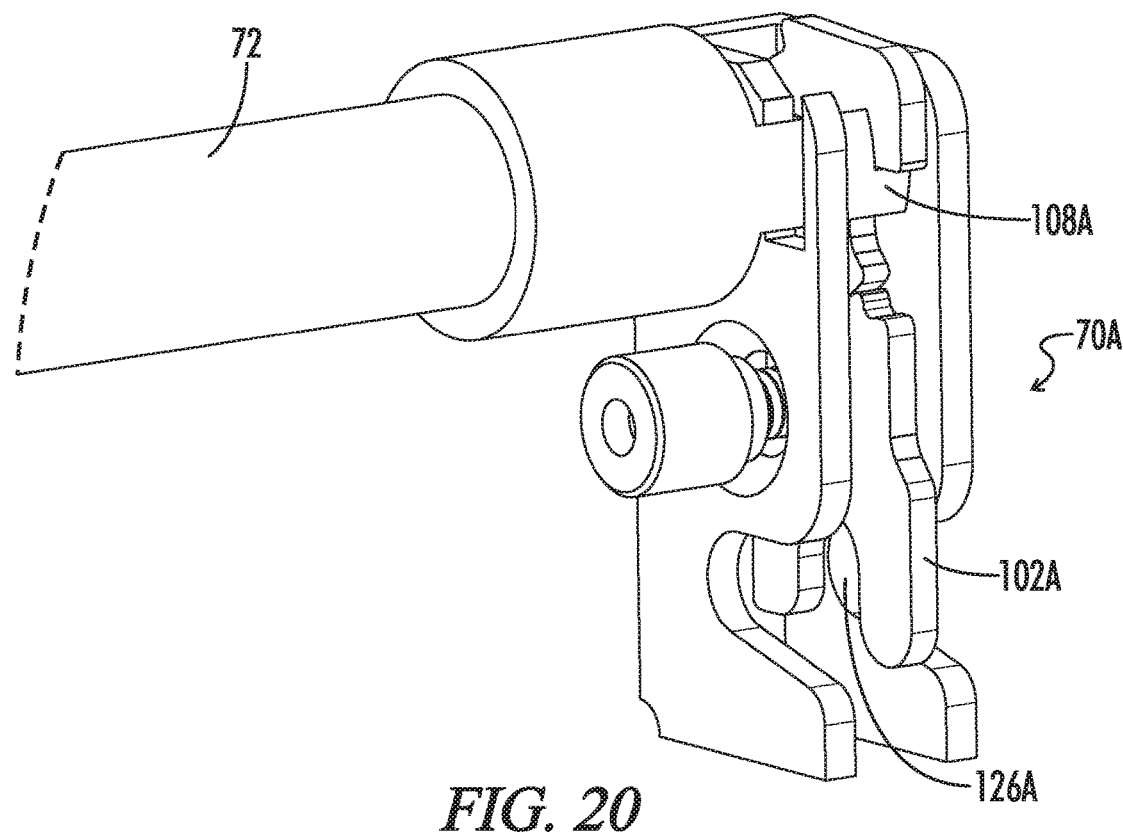
FIG. 20 illustrates a front perspective view of the circled area labelled with the numeral 20 in FIG. 19.
Figure 21:
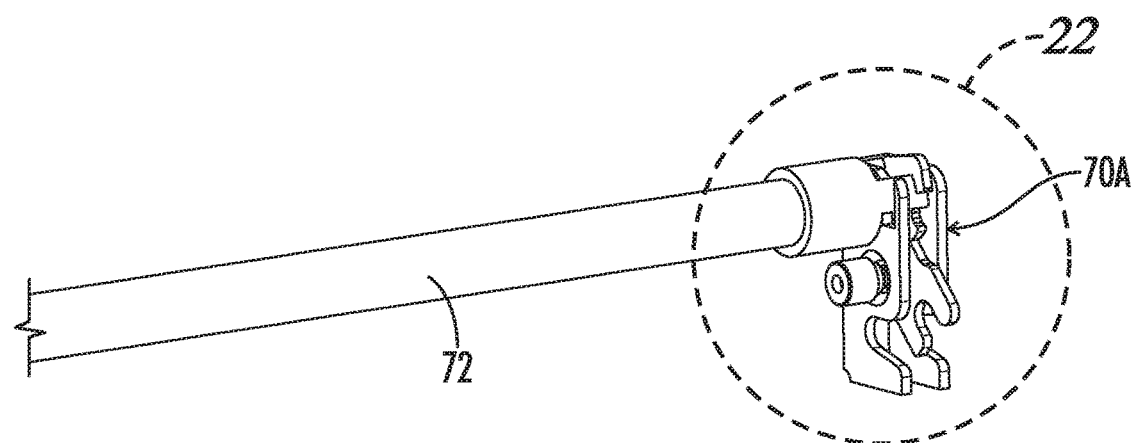
FIG. 21 illustrates a front perspective view of a portion of the at least one rotatable rod and right side rotary latch of the tailgate of FIG. 1.
Figure 22:
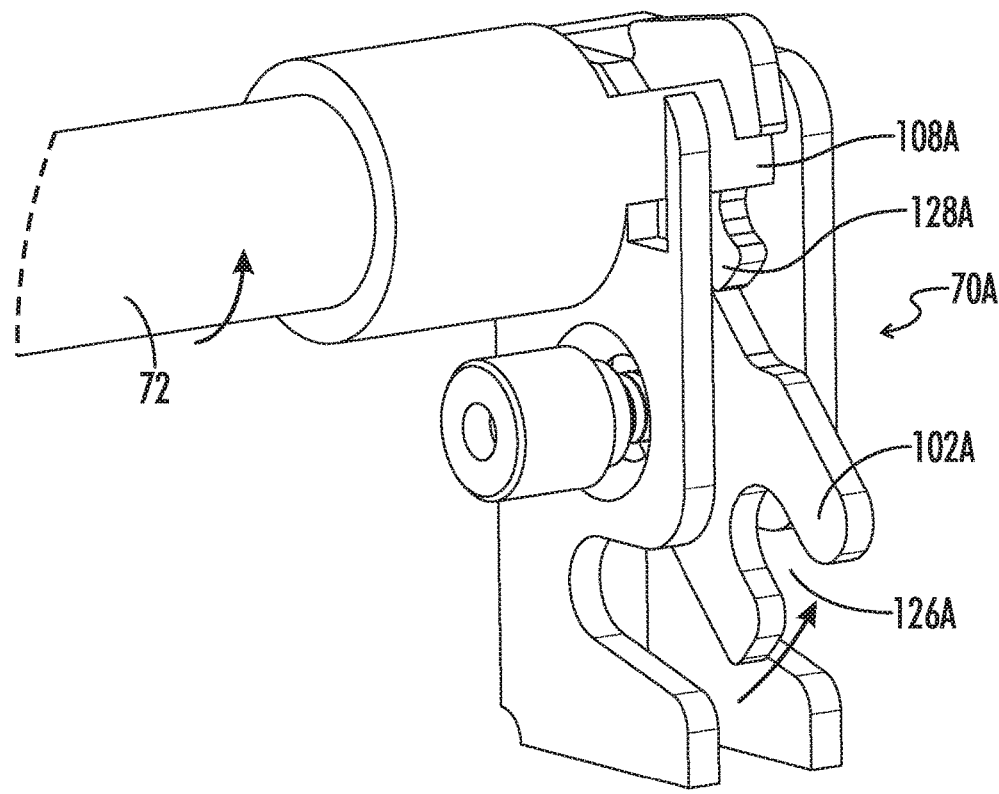
FIG. 22 illustrates a front perspective view of the circled area labelled with the numeral 22 in FIG. 21.

Optionally, as shown in FIGS. 3, 4, 9-12, the tailgate latch system further comprises a spring 120 comprising a proximal end 122 connected to (preferably engaging) at least one of the tailgate front surface 42 and tailgate rear surface 44 and a distal end 124 connected to the at least one rotatable rod 72, the spring 120 configured to return the at least one rotatable rod 72 and button 66 to the start position. Optionally, as best seen in FIGS. 11-12, the spring 120 wraps around a spring bolt 130 attached to a spring bracket 132 that is in turn attached to the at least one rotatable rod 72.

Optionally, the at least one rotatable rod 72 is located adjacent to the top of the tailgate 56. Optionally, the hinge is in the form of a hinge rod 62 extending through the tailgate interior 48 and generally parallel to the tailgate width 54 and located below the at least one rotatable rod 72. Optionally, the button is a push button 66, the at least one rotatable rod 72 is configured to rotate approximately between about 5 and 20 degrees when the push button 66 is depressed. Optionally, the at least one rotatable rod 72 is generally cylindrical in shape. Optionally, the at least one rotatable rod 72 is comprised of a plurality of attached rods 70. Optionally, the at least one rotary latch 70 comprises a left rotary latch 70 connected to the at least one rotatable rod proximal end 74 and tailgate left side 50 and a right rotary latch 70 connected to the at least one rotatable rod distal end 76 and tailgate right side 52, the at least one striker pin 68 comprises a left striker pin 68 connected to the left bedside 22 adjacent to the left bedside rear end 24 and a right striker pin 68 connected to the right bedside 26 adjacent to the right bedside rear end 28, and the right rotary latch 70 is configured to releasably engage the right striker pin 68 and the left rotary latch 70 is configured to releasably engage the left striker pin 68.

| Part List | |
|---|---|
| System | 10 |
| Pickup truck | 12 |
| Pickup forward section | 14 |
| Truck cab | 16 |
| Pickup rear section | 18 |
| Cargo area | 20 |
| Wheel | 21 |
| Left bedside | 22 |
| Left bedside rear | 24 |
| Right bedside | 26 |
| Right bedside rear | 28 |
| Truck bed | 30 |
| Bed front | 32 |
| Bed rear | 34 |
| Bed left side | 36 |
| Bed right side | 38 |
| Tailgate | 40 |
| Tailgate front surface | 42 |
| Tailgate rear surface | 44 |
| Tailgate thickness | 46 |
| Tailgate interior | 48 |
| Tailgate left side | 50 |
| Tailgate right side | 52 |
| Tailgate width | 54 |
| Tailgate top | 56 |
| Tailgate bottom | 58 |
| Tailgate height | 60 |
| Hinge/hinge rod | 62 |
| Tailgate pivot axis | 64 |
| Push button | 66 |
| Striker pin(s) | 68 |
| Rotary latch(es) | 70 |
| Rotatable rod | 72 |
| Rod proximal end | 74 |
| Rod distal end | 76 |
| Rod length | 78 |
| Rod pivot axis | 80 |
| L-shaped button mounting bracket | 82 |
| Vertical bar portion | 84 |
| Horizontal Bar portion | 86 |
| Horizontal bar proximal end | 88 |
| Horizontal bar distal end | 90 |
| C-shaped recess | 92 |
| Bracket pin | 94 |
| Rotatable rod wall | 96 |
| Wall slot | 98 |
| Rod interior | 100 |
| At least one rotary jaw | 102 |
| Rotary jaw pivot axis | 104 |
| Rotary jaw bolt | 106 |
| Rod extension(s) | 108 |
| Handle bracket | 110 |
| Handle bracket left side | 112 |
| Round pin opening(s) | 114 |
| Round rotatable rod opening(s) | 116 |
| Handle bracket right side | 118 |
| Spring | 120 |
| Spring proximal end | 122 |
| Spring distal end | 124 |
| Rotary jaw recess | 126 |
| rotary pawl | 128 |
| Spring Bolt | 130 |
| Spring Bolt bracket | 132 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A tailgate system comprising:
a pickup truck comprising a forward section comprising a truck cab, a rear section comprising a cargo area comprising a left bedside having a left bedside rear, a right bedside having a right bedside rear, a cargo area bottom comprising a truck bed, the truck bed comprising a bed front, a bed rear, a bed left side and a bed right side;
a tailgate located at the bed rear and comprising a front surface, a rear surface, a tailgate thickness extending from the front surface to the rear surface, a tailgate interior, a tailgate left side, a tailgate right side, a tailgate width extending from the tailgate left side to the tailgate right side and generally perpendicular to the tailgate thickness, a tailgate top, a tailgate bottom, a tailgate height extending from the tailgate top to the tailgate bottom and generally perpendicular to the tailgate width and tailgate thickness, the tailgate hingedly attached to the left bedside and the right bedside by a hinge located adjacent to the tailgate bottom, the tailgate configured to pivot along a tailgate pivot axis from an upright position in which the tailgate front surface is generally perpendicular to the truck bed and faces the cargo area to a lowered position in which the tailgate is generally parallel to the truck bed,
a tailgate gate latch system comprising a button located on the tailgate rear surface or tailgate front surface, at least one striker pin located on at least one of the left bedside adjacent to the left bedside rear and the right bedside adjacent to the right bedside rear, at least one rotary latch configured to releasably engage the at least one striker pin and prevent the tailgate from moving relative to the at least one striker pin, and at least one rotatable rod connected to the rotary latch and having a proximal end, a distal end, and a rotatable rod length generally parallel to the tailgate width,
wherein the tailgate pivot axis is generally parallel to the tailgate width,
wherein the at least one rotary latch is configured to releasably engage the at least one striker pin and maintain the tailgate in the upright position,
wherein, when the tailgate is in the upright position, actuating the button is configured to cause the at least one rotatable rod to rotate counterclockwise or clockwise from a start position about a rod pivot axis generally parallel to the tailgate pivot axis and cause the at least one latch to disengage from the striker pin, thereby causing the tailgate to move from the upright position to the lowered position.

2. The tailgate system of claim 1, wherein the button is a push button, wherein the at least one rotatable rod is located in the tailgate interior, wherein the tailgate latch system further comprises a generally L-shaped button-mounting bracket located in the tailgate interior and having a vertical bar portion attached to the push button, a horizontal bar portion comprising a distal end, and a generally C-shaped recess located between the horizontal bar portion and vertical bar portion, a bracket pin located in the generally C-shaped recess, wherein the generally L-shaped button-mounting bracket is configured to pivot at the bracket pin, the at least one rotatable rod adjacent to the horizontal bar portion comprises an interior and a wall surrounding the interior and comprising a slot, wherein the distal end of the horizontal bar portion extends through the slot into the rotatable rod interior, and further wherein depressing the push button is configured to move the distal end of the horizontal bar portion upwards at an angle and thereby cause the at least one rotatable rod to rotate clockwise or counterclockwise.

3. The tailgate system of claim 2 wherein, when the tailgate is in the upright position, the vertical bar portion is generally parallel to the tailgate height and the horizontal bar portion is generally perpendicular to the tailgate height.

4. The tailgate system of claim 2 wherein the bracket pin is attached to and, configured to move, with the generally L-shaped button mounting bracket.

5. The tailgate system of claim 2 wherein the at least one rotary latch comprises at least one rotary jaw comprising two arms separated by a rotary jaw recess, wherein at least one of the rotatable rod proximal end and rotatable rod distal end comprises an extension, and further wherein rotation of the at least one rotatable rod is configured to cause the extension to cause the at least one rotary jaw to rotate about a rotary jaw bolt along a rotary jaw pivot axis generally parallel to the tailgate width from a rotary jaw start position in which the two arms of the at least one rotary jaw surround the at least one striker pin and the at least one striker pin is located in the rotary jaw recess and prevents the at least one striker pin from moving to a disengaged position in which the two moveable arms do not surround the at least one striker pin and allow the at least one striker pin to move.

6. The tailgate system of claim 5 wherein the at least one rotary latch further comprises a rotary pawl engaging the extension and the rotary jaw, and further wherein rotation of the at least one rotatable rod is configured to cause the extension to cause the rotary pawl to rotate and thereby cause the rotary jaw to rotate about the rotary jaw bolt along the rotary jaw pivot axis.

7. The tailgate system of claim 1 wherein the tailgate comprises a tailgate skin attached to the tailgate left side and tailgate right side and forming the tailgate front surface and tailgate rear surface.

8. The tailgate system of claim 1 wherein the button is a push button, wherein the at least one rotatable rod is located in the tailgate interior, wherein the tailgate latch system further comprises a generally L-shaped button-mounting bracket located in the tailgate interior and having a vertical bar portion attached to the push button, a horizontal bar portion comprising a distal end, and a generally C-shaped recess located between the horizontal bar portion and vertical bar portion, a bracket pin located in the generally C-shaped recess, wherein the generally L-shaped button-mounting bracket is configured to pivot at the bracket pin, the at least one rotatable rod adjacent to the horizontal bar portion comprises an interior and a wall surrounding the interior and comprising a slot, wherein the distal end of the horizontal bar portion extends through the slot into the rotatable rod interior, and further wherein depressing the push button is configured to move the distal end of the horizontal bar portion upwards at an angle and thereby cause the at least one rotatable rod to rotate clockwise or counterclockwise, wherein the tailgate further comprises a handle bracket surrounding the push button and having a left side comprising a round pin opening receiving a portion of the bracket pin and a round rotatable rod opening receiving a portion of the at least one rotatable rod, and a right side comprising a round opening receiving another portion of the bracket pin and a round rotatable rod opening receiving another portion of the at least one rotatable rod and further wherein the push button is located between the handle bracket left side and the handle bracket right side.

9. The tailgate system of claim 8 wherein the handle bracket is attached to at least one of the tailgate front surface and tailgate rear surface.

10. The tailgate system of claim 1 wherein the tailgate latch system further comprises a spring comprising a proximal end connected to at least one of the tailgate front surface and tailgate rear surface and a distal end connected to the at least one rotatable rod, the spring configured to return the at least one rotatable rod and button to the start position.

11. The tailgate system of claim 1 wherein the at least one rotatable rod is located adjacent to the top of the tailgate.

12. The tailgate system of claim 1 wherein the hinge is in the form of a hinge rod extending through the tailgate interior and generally parallel to the tailgate width, and further wherein the hinge rod is located below the at least one rotatable rod.

13. The tailgate system of claim 1 wherein the button is a push button, the at least one rotatable rod is configured to rotate approximately between about 5 and 20 degrees when the push button is depressed.

14. The tailgate system of claim 1 wherein the at least one rotatable rod is generally cylindrical in shape.

15. The tailgate system of claim 1 wherein the at least one rotatable rod is comprised of a plurality of attached rods.

16. The tailgate system of claim 1 wherein the at least one rotary latch comprises a left rotary latch connected to the rotatable rod proximal end and a right rotary latch connected to the rotatable rod distal end, wherein the at least one striker pin comprises a left striker pin connected to the left bedside adjacent to the left bedside rear end and a right striker pin connected to the right bedside adjacent to the right bedside rear end, and further wherein the right rotary latch is configured to releasably engage the right striker pin and the left rotary latch is configured to releasably engage the left striker pin.

* * * * *